3,122,456
PURIFICATION OF SUGAR SOLUTIONS BY MEANS OF SPONGY ION EXCHANGERS
Erhard Meier, deceased, late of Leverkusen, Germany, by Ingeburg Meier, Jurgen-Dietrich Meier, and Sigrid Meier, heirs, Leverkusen, Germany, and Herbert Corte, Leverkusen, Germany, assignors to Farbenfabriken Bayer Aktiengesellschaft, Leverkusen, Germany, a corporation of Germany
No Drawing. Filed Feb. 8, 1960, Ser. No. 7,483
Claims priority, application Germany Feb. 16, 1959
15 Claims. (Cl. 127—46)

The present invention relates to purification of sugar solutions by means of spongy ion exchangers and more especially by means of spongy cation exchangers.

It is known to remove salt from sugar solutions by means of ion exchangers. A procedure which is frequently used industrially is first of all to extract the cations with a cation exchanger and to remove the acids liberated by a subsequent treatment with an anion exchanger. In order to counteract the danger of formation of invert sugar, it is however known to work with the converse direction, i.e. using first of all the anion exchanger and then the cation exchanger. In all cases, sugar solutions are obtained which in practice no longer contain any salt-forming constituents.

When using these processes, it has also simultaneously been observed that a more or less strong clarifying or decolorising is achieved. This decolorising effect is primarily produced by the anion exchanger. An additional observation was that these decolorising effects subsided in course of time or could only be maintained with difficulty by special regenerating processes. As a consequence of these observations, special adsorbents were then developed for quite special decolorising processes. However, even then the maintenance of the decolorising action involves special and also costly regenerating processes. This separate decolorising and desalting can for economic reasons only be used in exceptional cases.

Anion exchangers and especially strongly basic anion exchangers have already been described, which are obtained from cross-linked copolymers of an aromatic monovinyl compound and a copolymerizable cross-linking agent, such as divinyl benzene, by haloalkylating the copolymer and aminating the haloalkylated copolymer with an amine, such as trimethylamine or dimethylamino ethanol. Anion exchangers of this type are for instance disclosed in United States patent specifications 2,591,- 573, 2,591,574, 2,614,099, 2,616,877, 2,629,710, 2,631,- 999, 2,632,000, 2,642,417, 2,725,361, and 2,794,785. The porosity of these resins is inversely proportional to the degree of cross-linkage of the copolymer matrix to which the ion-exchanging groups are bonded. The anion exchangers being derived from a weakly cross-linked matrix are capable of absorbing to a certain degree color bodies from sugar solutions, but they have the drawback that they display a high degree of swellability. Moreover, these resins are of homogeneous structure, this is to say in swollen condition they are transparent as glass.

Contrary thereto, the present invention deals with the purification of sugar solutions by means of spongy synthetic ion exchangers. These ion exchangers are permeated by small cavities or veins and therefore are opaque in swollen condition. Due to their large internal surface these resins are capable to absorb large molecules, even if the matrix of said resins is comparatively highly cross-linked. They may be obtained in the form of hard solid products, distinguished by a comparatively small degree of swellability, so that the volume of the resin when soaked in water does not surpass about 2 to 5 times that of the original dry volume.

These spongy ion exchangers are also different in characteristics from the ion exchangers, the matrix of which is formed by a "proliferous" or "popcorn" polymer. These products have a very high degree of swellability, for instance sulfonic acid exchangers of this type expand to at least twenty times their dry volume when soaked in water.

Under the term "spongy ion exchanger," as used in the present specification, we understand non-proliferous synthetic water-insoluble ion exchange resins, the matrix of which is formed of a cross-linked organic copolymer of heterogeneous structure, such spongy ion exchangers being disclosed in French patent specifications 1,199,562, 1,205,505, and 1,211,485.

It has now been found that the decolorising effect in the purification of sugar solutions by means of ion exchangers can be substantially improved by using for this purification spongy cation exchangers.

This discovery is very surprising, since former observations indicated that the usual synthetic cation exchangers with a homogeneous gel structure have in practice no decolorising effect, or only a very slight effect. Clarification in juices which have travelled through such cation exchangers is substantially determined by the change in pH value which has occurred. Furthermore, the opinion formerly held was that the color-yielding impurities in solutions containing sugar, more especially in beet or cane sugar juices, constitute substantially neutral or acid elements. Spongy cation exchangers are for example described in French Specification 1,205,505. These exchangers are able to absorb relatively large molecules and to give the latter off again upon regeneration with conventional regeneration agents. By using these cation exchangers, it is therefore possible for the various color complexes contained in the sugar solutions to be absorbed by the ion exchangers which are specific for them, whereby it is possible not only to increase the purity in the final product, but above all also to facilitate the necessary regeneration. These cation exchangers can be used in ion exchanger plants for the purification of sugar solutions in the combination with anion exchangers as known per se. It is particularly suitable to use spongy anion exchangers. Such spongy anion exchangers are described by way of example in German specifications 1,045,102, 1,049,583 and 1,054,- 715 or in French specifications 1,199,562, 1,217,732, and 1,211,485. The sugar solutions may be first treated with the spongy cation exchanger in the hydrogen form and then with the anion exchanger in the hydroxyl form, which exchangers may be arranged in suitable filter columns through which the solutions are passed, but also the converse sequence is possible. It is, however, also possible to choose combinations with more than two filters connected in series. The choice of the most suitable combination is determined by the character of the juice to be purified. It is also possible for an anion exchanger to be used in neutral exchange, preferably a quaternary anion exchanger with a homogeneous gel or sponge structure and charged with chloride or sulfate ions, which neutral exchanger is arranged for example before the said H˙ or OH′ exchangers, the said neutral quaternary exchanger acting exclusively as a decolorizing filter and not as a salt-extracting filter. Furthermore, it is also possible to use the spongy cation exchangers and the anion exchangers simultaneously, as for instance in a mixed-bed filter.

In the development of the present process, it has further been observed that the color complexes absorbed by the spongy cation exchanger are absorbed in a relatively narrow zone. This zone migrates through the filter as the charging increases. The inorganic cations simultaneously absorbed by the cation exchanger, such as for example $Ca^{..}$, $Mg^{..}$ and $K^{.}$, are responsible for this phenomenon, since they displace organic molecules from the cation exchanger. This observation is at the same time also evidence of the ease with which these color bodies may be removed from the exchangers during regeneration.

As a result, there is provided yet another interesting possibility. If a conventional cation exchanger of homogeneous gel structure which cannot or can only slightly absorb color bodies or other large molecules is arranged before the spongy cation exchanger, the displacement effect which has been described is prevented. The first cation exchanger absorbs practically only the strongly dissociated small ions, such as for example $Ca^{..}$, $Mg^{..}$, $K^{.}$. The second following cation exchanger is then operated as a hydrogen ion exchanger and has only to take up the color-yielding complexes which are weakly or not dissociated, a larger output being produced simultaneously by the avoidance of the displacement effect.

For carrying through the processes disclosed in the following examples the following ion exchangers are used:

$K_1$—Cation exchanger of homogeneous gel structure produced by sulfonating a bead copolymer of 90 parts by weight of styrene and 10 parts by weight of divinyl benzene.

$K_2$—Spongy cation exchanger produced according to Example 3 of French patent specification 1,205,505 by sulfonating a copolymer of 90 parts by weight of styrene and 10 parts by weight of divinyl benzene, said copolymer being obtained by copolymerizing the cited monomers in aqueous suspension in the presence of 100% by weight of white spirit, said percentage being calculated on the weight of the monomers.

$K_3$—Spongy cation exchangers produced in the same manner as cation exchanger $K_2$ with the variation that 80% of normal heptane are used instead of 100% of white spirit in the production of the styrene divinyl benzene copolymer.

$K_4$—Carboxylic cation exchanger of homogeneous gel structure produced by alkaline saponification of a copolymer of 95 parts by weight of methyl acrylate and 5 parts by weight of divinyl benzene, the cited copolymer being obtained by copolymerizing the aforementioned monomers in aqueous suspension.

$K_5$—Spongy carboxylic cation exchanger produced according to the prescription given in Example 1 of French patent specification 1,205,505 by saponifying a spongy copolymer of methyl acrylate and divinyl benzene with the variation that only 5% by weight (as calculated on the amount of the monomers) of divinyl benzene and that 70% by weight (as calculated on the weight of the monomers) of normal octane are used instead of decanol.

$A_1$—Anion exchanger having tertiary amino groups and being of homogeneous gel structure produced according to the method applied for the production of anion exchanger $A_2$ disclosed below with the variation that no decanol is employed for the production of the copolymer matrix.

$A_2$—Spongy anion exchanger having tertiary amino groups produced according to Example 4 of French patent specification 1,199,562 by copolymerising 90 parts by weight of vinyl toluene and 10 parts by weight of ethylene glycol dimethacrylate in aqueous suspension in the presence of 60% by weight (as calculated on the weight of the monomers) of normal decanol, chloromethylating the copolymer and aminating the chloromethylated copolymer by means of dimethyl amine.

$A_3$—Anion exchanger of homogeneous gel structure having tertiary amino groups produced according to Example 7 of French patent specification 1,217,732 by aminomethylating a polystyrene which is cross-linked by means of 6% by weight of divinyl benzene and alkylating said aminomethylated cross-linked polystyrene by means of formaldehyde and formic acid.

$A_4$—Spongy anion exchanger having tertiary amino groups obtained by producing a spongy copolymer of 90 parts by weight of styrene and 10 parts by weight of divinyl benzene according to the prescription given in Example 2 of French patent specification 1,217,732, whereby the cited monomers are copolymerised in an aqueous suspension in the presence of 70% (as calculated on the weight of monomers) of white spirit, aminomethylating said spongy copolymer according to the prescription given in the same example of French patent specification 1,217,732 by reacting said copolymer with N-(chloromethyl)-phthalimide and hydrolising the reaction product obtained and thereafter alkylating said aminomethylated copolymer according to the prescription given in Example 9 of the cited French patent specification by means of formaldehyde and formic acid.

*Example 1*

For removing the salt and color from a cane sugar solution with 25° Brix and a color index of 130° Stammer/100° Brix there are used two series-connected filters, the first of which is filled with 1 litre of a cation exchanger and the second with 1 litre of an anion exchanger. In the first series, the cation exchanger $K_1$ is used in the hydrogen form and the anion exchanger $A_1$ is used in the hydroxyl form, both exchangers having a homogeneous gel structure. In the second case, the cation exchanger $K_2$ and the anion exchanger $A_2$ are used, both having a sponge structure. The cation exchangers $K_1$ and $K_2$ are first regenerated with a 10% aqueous hydrochloric acid solution and the anion exchangers $A_1$ and $A_2$ with a 5% aqueous sodium hydroxide solution. Thereafter the exchangers are charged with the aforesaid cane sugar solution by passing 5 litres of solution through each filter within one hour, the degree of decolorizing being determined behind the cation exchanger and behind the anion exchanger after the passage of 1 litre in each case. The values hereby obtained are set out in the following table:

| Decolorizing in percent after | Litres | | | | | | |
|---|---|---|---|---|---|---|---|
| | 1 | 2 | 3 | 4 | 5 | 6 | 7 |
| After $K_1$ | 29 | 29 | 28 | 27.5 | 27.5 | 27 | 26.5 |
| After $A_1$ | 32 | 32 | 32 | 31 | 31 | 31 | 31 |
| After $K_2$ | 69 | 69 | 68 | 67 | 65 | 63 | 55 |
| After $A_2$ | 98 | 98 | 98 | 98 | 98 | 98 | 97 |

From a comparison of the above data it becomes evident that the decolorizing effect of the spongy exchangers is by far superior to that obtained with the homogeneous exchangers.

*Example 2*

A cane sugar solution of 25° Brix and a color index of 128° Stammer/100° Brix is filtered over three series-connected filters, of which filter 1 contains the cation exchanger $K_1$ having a homogeneous gel structure, filter 2 contains the spongy cation exchanger $K_2$ and filter 3 contains the weakly basic spongy anion exchanger $A_4$. Filters 1 and 2 were regenerated with 10% aqueous hydrochloric acid solution and filter 3 with 5% aqueous sodium hydroxide solution. The specific loads used in charging the filters were the same as in Example 1.

The following degrees of decolorizing in percent were found:

| Litres of filtrate per litre of exchanger | 1 | 5 | 10 | 15 | 20 |
|---|---|---|---|---|---|
| After filter 1 | 32 | 20 | 20 | 20 | 18 |
| After filter 2 | 72 | 60 | 60 | 60 | 60 |
| After filter 3 | 98 | 99 | 99 | 99 | 99 |

After exhaustion, filters 1 and 3 were regenerated and used again for the purification of the sugar solution. There were obtained the same values as indicated above. The regeneration of filter 2 became necessary only after filters 1 and 3 were regenerated six times. For the regeneration of filter 2, the regenerant leaving filter 3 was passed over filter 2 in order to remove the color bodies absorbed by the cation exchanger contained in filter 2. After the wash-water leaving filter 3 was also passed over filter 2, the regenerant leaving filter 2 became alkaline, whereby practically all color bodies were removed from filter 2. After having discharged the alkaline regenerant by means of water, filter 2 was transformed into the hydrogen form by means of 10% aqueous hydrochloric acid solution, whereby the whole regenerant leaving said filter was used for the preliminary regeneration of filter 1.

From the aforementioned data it becomes evident that the decolorizing achieved by the spongy cation exchanger $K_2$ is considerably higher than that achieved by cation exchanger $K_1$ having a homogeneous gel structure.

The aforementioned effect is not only achieved with cane sugar solutions, but also with beet sugar molasses and green juices.

Example 3

There was determined the degree of decolorizing in percent which was achieved when passing a beet sugar molasses of 25° Brix and a color index of 20° Stammer over the cation exchangers $K_1$ and $K_2$ under the conditions disclosed in Example 1, after both exchangers were regenerated with 10% aqueous hydrochloric acid solution:

| Litres of filtrate per litre of exchanger | 5 | 10 | 15 | 20 | 25 | 30 |
|---|---|---|---|---|---|---|
| $K_1$ | 20 | 13 | 9 | 7 | 6 | −3 |
| $K_2$ | 77 | 70 | 68 | 60 | −20 | −60 |

The negative values in the above table indicate that the color of the filtrate was higher than that of the influent solution. It is evident that with 20 litres of filtrate per litre of exchanger, $K_2$ has considerably higher decolorizing effect than $K_1$. The color bodies of filter $K_2$ are discharged at an earlier stage than those of $K_1$, since filter $K_2$ is exhausted by the cations absorbed from the sugar solution at an earlier stage as is the case with filter $K_1$.

In case that for carrying through the aforementioned experiment a beet sugar molasses is used, from which the inorganic cations are removed, the superior decolorizing action of the spongy cation exchanger becomes still more evident, since in this case only use is made of the decolorizing capacity, but not of the capacity for binding inorganic cations.

Example 4

A beet sugar molasses of 12° Brix, having a color index of 10° Stammer, from which the inorganic cations were removed by ion-exchange, is filtered through cation exchanger $K_1$ on the one hand and cation exchanger $K_2$ on the other hand, which cation exchangers were regenerated by means of 10% aqueous sulfuric acid (flow rate 5 litres of molasses per one hour and per one litre of exchanger). The degree of decolorizing obtained is disclosed in the following table. The values given therein are percentages of removed color bodies determined after passage of the cited amounts of liquid through the respective exchangers.

| Litres of filtrate per litre of exchanger | 10 | 20 | 30 | 40 | 50 | 60 | 70 | 80 | 90 | 100 |
|---|---|---|---|---|---|---|---|---|---|---|
| $K_1$ | 13 | 7 | 0 | 0 | 0 | 0 | 0 | 0 | 0 | 0 |
| $K_2$ | 75 | 70 | 65 | 63 | 60 | 58 | 57 | 55 | 55 | 55 |

Similar effects are achieved when the spongy cation exchanger is used for the purification of aqueous glucose solutions, as they are for instance obtained by hydrolysis of starch or wood.

Example 5

A so-called wood sugar solution, as it is obtained by acid hydrolysis of wood, is filtered over the cation exchanger $K_1$ in the hydrogen form, whereby the inorganic cations contained in said solution are removed. The resulting solution had a content of dry substance of 10.3° Brix and a color index of 7.8° Stammer. This solution was passed in parallel experiments over one litre each of the cation exchangers $K_1$, $K_2$, $K_3$, $K_4$ and $K_5$, whereby the following values (in percent) for the decolorizing were determined:

| Litres of filtrate per litre of exchanger | 10 | 20 | 30 | 40 | 50 | 60 | 70 | 80 | 90 | 100 |
|---|---|---|---|---|---|---|---|---|---|---|
| $K_1$ | 20 | 10 | 0 | 0 | 0 | 0 | 0 | 0 | 0 | 0 |
| $K_2$ | 75 | 70 | 68 | 65 | 65 | 65 | 65 | 64 | 64 | 63 |
| $K_3$ | 5 | 0 | 0 | 0 | 0 | 0 | 0 | 0 | 0 | 0 |
| $K_4$ | 45 | 40 | 40 | 38 | 38 | 37 | 35 | 33 | 31 | 30 |

From these experiments it becomes evident that not only the spongy cation exchangers of the sulfonic acid type, but also those containing carboxylic acid groups have a considerably higher decolorizing action than the cation exchangers with homogeneous gel structure. The high decolorizing action of the spongy cation exchangers is not only achieved in single filters, but also when these exchangers are used in mixed-bed filters, especially when the mixed-bed filter contains a spongy cation exchanger and a spongy anion exchanger, and a filter with a cation exchanger in the hydrogen form is applied before the mixed-bed filter.

Example 6

A diluted beet sugar molasses is passed through the cation exchanger $K_1$ which had been regenerated by means of a 10% aqueous hydrochloric acid solution. The debased molasses obtained had a color index of 12° Stammer and was passed over a mixed-bed containing equal parts by weight of $K_2$ and $A_4$ ($MB_1$) and for comparison over a mixed-bed containing equal parts by weight of $K_1$ and $A_4$ ($MB_2$). The following values in percent for the decolorizing action achieved were found:

| Litres of filtrate per litre of exchanger | 5 | 10 | 15 | 20 | 25 | 30 | 35 |
|---|---|---|---|---|---|---|---|
| $MB_1$ | 99 | 98 | 97 | 96 | 96 | 96 | 75 |
| $MB_2$ | 93 | 77 | 60 | 50 | 30 | 10 | 5 |

The use of the spongy exchangers in the mixed-bed is of special advantage for the decolorizing of a demineralized sugar solution. It is, for instance, possible to pass the sugar solution first through a mixed-bed containing cation and ion exchangers with a homogeneous gel structure and thereafter through a mixed-bed with spongy cation and anion exchangers.

The spongy cation exchangers as they may be used for practicing the present invention are water-insoluble resins containing sulfonic acid and/or carboxylic acid groups bonded to a cross-linked copolymer matrix of heterogeneous structure, said matrix being obtained by copolymerizing a monoethylenically monomer such as a monovinyl benzene, an α-β-ethylenically unsaturated carboxylic acid or an ester thereof, and a polyethylenically unsaturated monomer, a so-called cross-linking agent, such as a monomeric polyvinyl benzene, a glycol di-acrylate or -methacrylate, while dissolved in an inert organic liquid, such as an aliphatic hydrocarbon, which is a non-solvent for the linear, not cross-linked polymers of said monoethylenically unsaturated monomers such as polystyrene or polymethacrylate, to produce a cross-linked copolymer having occluded therein substantially the total inert liquid present in the reaction medium and removing said occluded liquid from said copolymer, the cited inert organic liquid being preferably applied in amounts of 30 to 300% by weight as calculated on the weight of the total monomers, it being furthermore possible to carry through said copolymerization in aqueous dispersion. Instead of sulfonic acid or carboxylic acid groups, the resins may also contain phosphonic or phosphinic acid groups as cation exchanging groups. For nearer details regarding the production of these resins, reference is made to French patent specification 1,205,505 and corresponding applications in other countries, such as United States application Serial No. 727,045, filed April 8, 1958.

As illustrated in the examples, the regeneration of the exhausted spongy cation exchangers which have been used for decolorizing sugar solutions is preferably effected by first applying an aqueous 1–10% solution of a neutral inorganic salt (NaCl, KCl, $Na_2SO_4$) and/or of a base (NaOH, KOH, LiOH, $NH_4OH$) and thereafter an aqueous 1–10% acid solution (HCl, $H_2SO_4$). In case that the spongy cation exchangers are applied in combination with anion exchangers, both exchangers being arranged in separate filters, it is preferred to use the alkaline regenerant of the anion exchange filter for the first regeneration step.

The spongy anion exchangers as they are used for practicing the present invention may have the same matrix as the spongy cation exchangers, preferably a spongy copolymer of a monovinylbenzene and 2–50% by weight of a polyvinylbenzene, to which matrix are bonded by way of alkylene groups (such as methylene groups), amine groups or quaternary ammonium groups, preferably tertiary amine groups, such as disclosed in the above cited specifications.

The present invention may be applied to the purification of any sugar solutions, including cane or beet sugar juices, such as raw sugar solutions or solutions that occur at any steps of said solutions, raw sugar juices that have been clarified by treatment with lime with or without carbonation etc., affination syrups, mother liquors obtained from massecuites, molasses, glucose solutions, such as corn syrups, maltose syrups, fruit juices, etc.

What is claimed is:

1. A process for decolorizing a sugar solution which comprises treating said solution with a spongy cation-exchange resin and then treating the resulting solution with a spongy anion-exchange resin, each of said exchange resins being a synthetic non-proliferous water-insoluble resin having as its matrix a cross-linked organic copolymer of heterogeneous structure, said resins being further characterized in that said spongy cation-exchange resin is in the hydrogen form and the matrix is a resin of 90 parts by weight of styrene and about 10 parts by weight of divinyl benzene copolymerized in an inert organic liquid, and said spongy anion-exchange resin is in the hydroxyl form, said anion-exchange resin having a plurality of tertiary amino groups and a matrix prepared from about 90 parts by weight of vinyl toluene and about 10 parts by weight of ethylene glycol dimethacrylate copolymerized in aqueous suspension in an inert organic liquid.

2. The process of decolorizing a sugar solution which comprises treating said sugar solution with a spongy cation-exchange resin in the hydrogen form and having as its matrix a resin prepared by copolymerizing about 90 parts of styrene and 10 parts of divinyl benzene in an inert organic liquid, and then contacting the solution with a weakly basic spongy anion-exchange resin, the matrix of which is prepared from about 90 parts by weight of styrene and about 10 parts by weight of white spirit, then amino-methylated, and thereafter alkylated.

3. A process for decolorizing a sugar solution which comprises treating said sugar solution with a spongy cation-exchange resin selected from the group consisting of $K_2$, $K_3$ and $K_5$ as defined hereinafter, and then treating of the resulting solution with a spongy anion-exchange resin selected from the group consisting of $A_2$ and $A_4$ as defined hereinafter, wherein $K_2$ is a spongy cation-exchange resin copolymer of about 90 parts by weight of styrene and 10 parts by weight of divinyl benzene copolymerized in aqueous suspension in the presence of white spirit; $K_3$ is a spongy cation-exchange resin copolymer containing about 90 parts by weight of styrene and about 10 parts by weight of divinyl benzene copolymerized in normal heptane; $K_5$ is a spongy carboxylic cation-exchange resin prepared by copolymerizing methyl acrylate and about 5% by weight of divinyl benzene in normal octane; $A_2$ is a spongy anion-exchange resin copolymer of about 90 parts by weight of vinyl toluene and about 10 parts by weight of ethylene glycol dimethacrylate copolymerized in normal decanol and thereafter chloromethylated and aminated; and $A_4$ is a weakly basic spongy anion-exchange resin copolymer of about 90 parts by weight of styrene and about 10 parts by weight of divinyl benzene copolymerized in white spirit, aminomethylated, and thereafter alkylated.

4. The process of claim 3 wherein said cation exchange resin after exhaustion is regenerated by first treating it with a regenerant selected from the group consisting of an aqueous alkali hydroxide solution and an alkali metal salt solution and thereafter with an aqueous solution of a mineral acid.

5. The process of claim 3 wherein said sugar solution has inorganic bases removed therefrom before it is contacted with said spongy cation-exchange resin.

6. The process of claim 3 wherein said anion-exchange resin after exhaustion is regenerated by means of an aqueous alkali metal hydroxide solution, after which said solution is used for regeneration of said spongy cation-exchange resin after its exhaustion.

7. A process for decolorizing a sugar solution which comprises passing said sugar solution through a cation-exchange resin having a homogeneous gel structure, followed by passing said solution through a spongy cation-exchange resin selected from the group consisting of $K_2$, $K_3$ and $K_5$, as defined hereinafter, and then treating the resulting solution with a spongy anion-exchange resin selected from the group consisting of $A_2$ and $A_4$ as defined hereinafter, wherein $K_2$ is a spongy cation-exchange resin copolymer of about 90 parts by weight of styrene and 10 parts by weight of divinyl benzene copolymerized in white spirit; $K_3$ is a spongy cation-exchange resin copolymer containing about 90 parts by weight of styrene and about 10 parts by weight of divinyl benzene copolymerized in normal heptane; $K_5$ is a spongy carboxylic cation-exchange resin prepared by copolymerizing methyl acrylate and about 5% by weight of divinyl benzene in normal octane; $A_2$ is a spongy anion-exchange resin copolymer of about 90 parts by weight of vinyl toluene and about 10 parts by weight of ethylene glycol dimethacrylate copolymerized in normal decanol and thereafter chloromethylated and aminated; and $A_4$ is a weakly basic spongy anion-exchange resin copolymer of about 90 parts by weight of styrene and about 10 parts by weight of a divinyl benzene copolymerized in white spirit, aminomethylated, and thereafter alkylated.

8. The process of claim 7 wherein said anion-exchange resin is one having neutralized quaternary ammonium groups.

9. A process for removing color bodies from a sugar solution which comprises treating said solution both with a cation-exchange resin in the hydrogen form and with an anion-exchange resin, both resins having as their matrix a cross-linked copolymer of a monoethylenically unsaturated monomer and a polyethylenically unsaturated monomer, said resin matrix having a spongy structure as the result of conducting the copolymerization of said monomers while they are dissolved in an inert aliphatic hydrocarbon which is a non-solvent for the polymers of said monoethylenically unsaturated monomers to produce a cross-linked copolymer having occluded therein substantially the total inert aliphatic hydrocarbon, followed by the removal of said occluded hydrocarbon from the cross-linked copolymer.

10. The process of claim 9 wherein said cation-exchange resin contains as cation-exchanging groups a member selected from the group consisting of sulfonic acid groups and carboxyl groups.

11. The process of claim 9 wherein said cation-exchange resin after exhaustion is regenerated with a regenerant selected from the group consisting of an aqueous alkali metal hydroxide solution and an alkali metal salt solution and thereafter with an aqueous solution of a mineral acid.

12. The process of claim 9 wherein said sugar solution has inorganic bases removed therefrom before it is contacted with said spongy cation-exchange resin.

13. The process of claim 9 wherein said sugar solution is first treated with said spongy cation-exchange resin in the hydrogen form and then with said anion-exchange resin in the hydroxide form, said anion-exchange resin containing tertiary amino groups as anion-exchanging groups.

14. The process of claim 9 wherein said anion-exchange resin after exhaustion is regenerated by means of an aqueous alkali metal hydroxide solution, after which said solution is used for regeneration of said spongy cation-exchange resin after exhaustion.

15. A process for removing color bodies from a sugar solution which comprises treating said solution with both a granular cation-exchange resin in the hydrogen form and with an anion-exchange resin, both resins having as their matrix a cross-linked copolymer of a monoethylenically unsaturated monomer and a polyethylenically unsaturated monomer, said matrix having a spongy structure as the result of conducting the copolymerization of said monomers in aqueous suspension while dissolved in an inert aliphatic hydrocarbon which is a non-solvent for the polymers of said monoethylenically unsaturated monomers to produce cross-linked copolymers beads having heterogeneously occluded therein substantially all of said inert aliphatic hydrocarbon, followed by removal of said occluded hydrocarbon from the beads.

References Cited in the file of this patent

UNITED STATES PATENTS

| | | |
|---|---|---|
| 2,366,007 | D'Alelio | Dec. 26, 1944 |
| 2,500,149 | Boyer | Mar. 14, 1950 |
| 2,671,059 | Smit | Mar. 2, 1954 |
| 2,785,998 | Harding et al. | Mar. 19, 1957 |
| 2,874,132 | Reiner | Feb. 17, 1959 |
| 2,911,329 | Blann | Nov. 3, 1959 |

FOREIGN PATENTS

| | | |
|---|---|---|
| 1,016,445 | Germany | Sept. 26, 1957 |

OTHER REFERENCES

Chem Abstracts, vol. 52, page 17767 f.

Nachod et al.: Ion Exchange Technology, 1956, Academic Press Inc., N.Y., pages 544–545 and 11–12.